United States Patent [19]
Hunt

[11] 3,782,701
[45] Jan. 1, 1974

[54] DESTRATIFICATION SYSTEM AND AIR DIFFUSER UNIT FOR USER THEREIN

[76] Inventor: Harold G. Hunt, 389 Fillmore Ave., East Aurora, N.Y. 14052

[22] Filed: Apr. 3, 1972

[21] Appl. No.: 240,689

[52] U.S. Cl............. 261/65, 210/220, 261/87, 261/121 R
[51] Int. Cl............................................... B01f 3/04
[58] Field of Search............. 210/123, 127, 219, 210/220; 261/65, 87, 93, 121 R, 122, 124

[56] References Cited
UNITED STATES PATENTS
| | | | |
|---|---|---|---|
| 3,242,072 | 3/1966 | Walker | 261/124 X |
| 2,597,931 | 5/1952 | Hano | 261/124 X |
| 1,579,355 | 4/1926 | Granwalt | 261/93 |
| 3,626,500 | 12/1971 | Dummann | 261/122 X |
| 3,677,936 | 7/1972 | Bastiaanse | 261/124 X |

Primary Examiner—Samih N. Zaharna
Assistant Examiner—Robert H. Spitzer
Attorney—John B. Bean et al.

[57] ABSTRACT

The system employs a plurality of submerged diffuser units spaced along a supply air feed line and an air-water discharge valve device disposed at the downstream end of the feed line to permit expulsion of substantially all water present in the feed line at the commencement of an operating period. The diffuser units are in the form of air jet reaction propellers, which effect vertical circulation by both mechanical and diffused air pumping.

10 Claims, 8 Drawing Figures

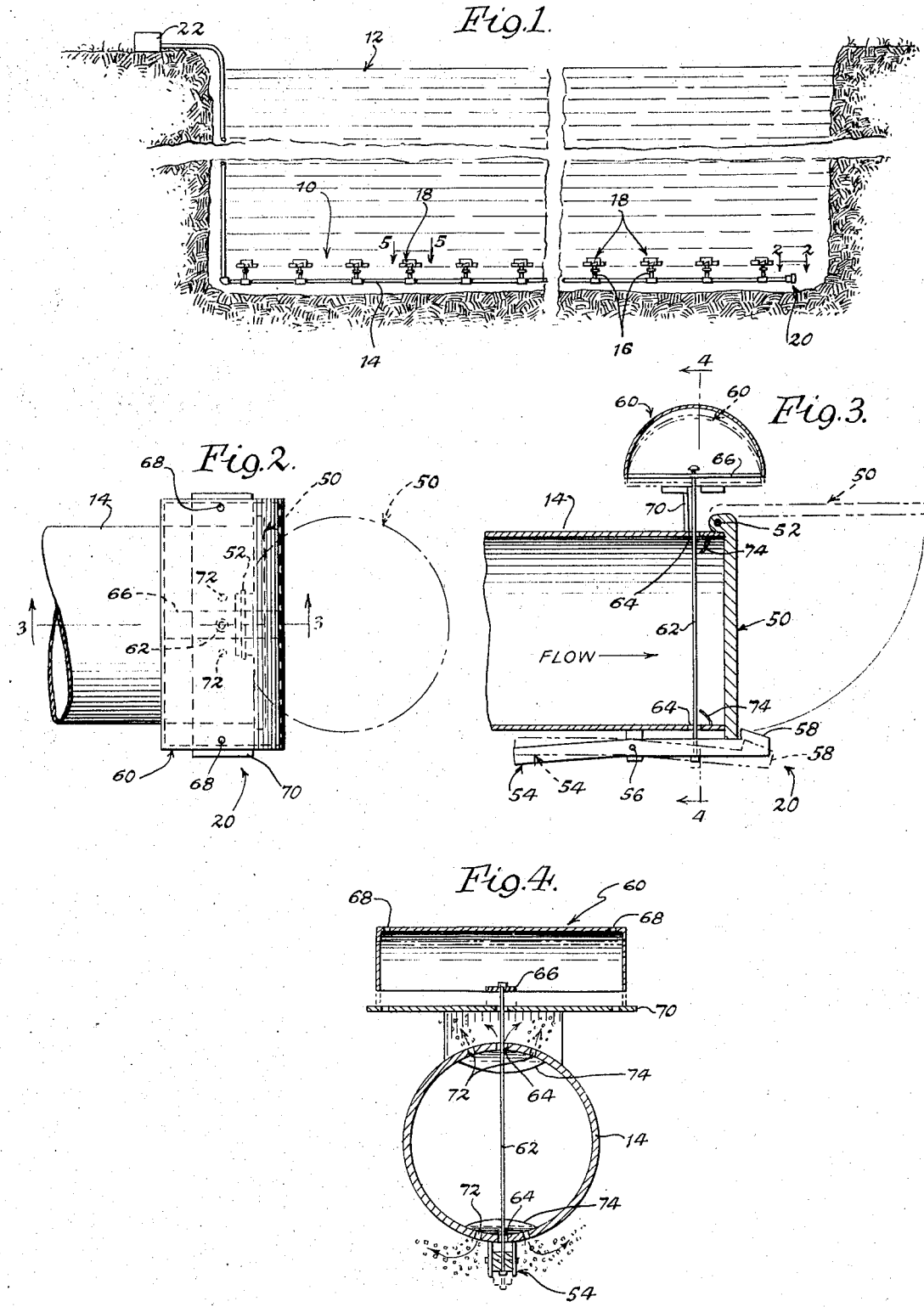

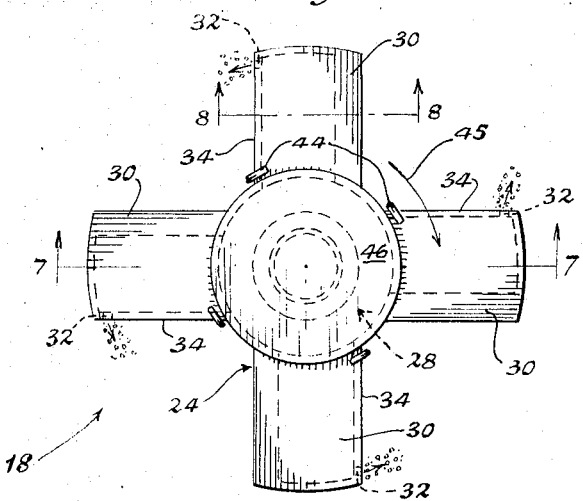
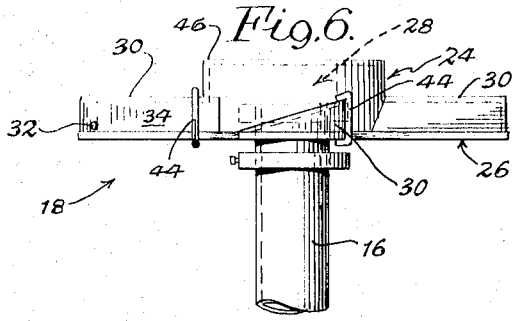
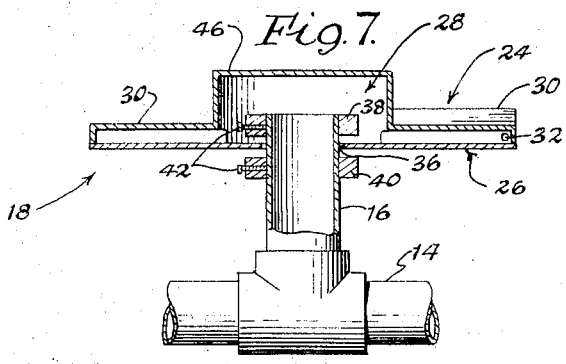
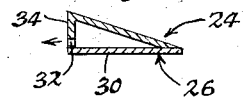

DESTRATIFICATION SYSTEM AND AIR DIFFUSER UNIT FOR USER THEREIN

BACKGROUND OF THE INVENTION

Thermal stratification occurs in many reservoirs, because of the detention time required for water to flow through the impoundment and the rate of heat exchange between the reservoir surface and the atmosphere. The water adjacent the surface of the reservoir constantly undergoes changes in temperature because of environmental conditions and such changes in temperature are accompanied by corresponding changes in water density. Thus, in the winter months, the colder, denser surface water settles and forces the bottom water to move upward. This vertical circulation and resultant aeration of the deep bottom water tends to produce a uniform quality of water in a reservoir. However, during the late spring and summer months, the warmer, less dense surface water restricts circulation and aeration of the bottom waters, resulting in the classical three layer thermo-pattern including the epilimnion, thermocline and hypolimnion.

The epilimnion, or upper layer, is generally of a good quality (containing 6 ppm. to 10 ppm. dissolved oxygen) and may be from between 20 to 30 feet deep according to the depth of the reservoir. The thermocline, or intermediate layer of water, is characterized by having rapidly decreasing temperature changes and a marginal quality (2 ppm. to 6 ppm. dissolved oxygen). Usually, dissolved oxygen concentrations decrease rapidly with depth in the thermocline. The hypolimnion, or lower layer, is cold and has little or no dissolved oxygen.

Since withdrawals of water from the epilimnion, or upper layer only, is impracticable and not consistent with the economical use of available water, present large reservoirs often discharge oxygen poor water from the lower water levels during the late summer and early fall months. Studies have indicated that such oxygen poor water has an adverse effect on the quality of the water for biological, domestic, and industrial uses downstream.

To date, numerous methods for improving the water quality of reservoir impoundment have been considered. Present systems feature the introduction of oxygen into the water in the hypolimnion layer in order to change its density sufficiently to cause vertical circulation and mixing of all strata in the reservoir. Oxygen introduction has been variously achieved, such as for instance by supplying pressurized air to a perforated pipe.

Various problems with all systems are to be expected on the basis of effectiveness vs. cost considerations. In present systems not employing complex backflow preventing valving arrangements difficulties will be encountered during system start up after a shut down with regard to the removal of water, which tends to completely fill the system during periods of non-use.

SUMMARY OF THE INVENTION

The present invention is directed towards a system and an improved air diffuser unit for use in effecting destratifaction and the introduction of oxygen into bodies of water.

More specifically, the system of the present invention features an arrangement wherein a plurality of submerged diffuser units are spaced along a supply air feed line and an air-water discharge valve device is disposed at the downstream end of the feed line for the purpose of permitting expulsion of substantially all water present in the feed line at the commencement of an operating period.

The diffuser units forming a part of the present invention are air jet reaction propellers, which serve to effect vertical circulation of water by both mechanical and diffused-air pumping techniques. Further, the present diffuser units incorporate a simple low cost construction, wherein the pressure of the supply air is employed to counter-balance gravity and circulation induced forces acting on the units during operation.

DRAWINGS

The nature and mode of the present invention will now be more fully described in the following detailed description taken with the accompanying drawings wherein:

FIG. 1 is a diagrammatic, elevational view illustrating the destratification system of the present invention installed in a reservoir or the like;

FIG. 2 is an enlarged view taken generally along the line 2—2 in FIG. 1;

FIG. 3 is a sectional view taken generally along line 3—3 in FIG. 2;

FIG. 4 is a sectional view taken generally along line 4—4 in FIG. 3;

FIG. 5 is an enlarged view taken generally along line 5—5 in FIG. 1;

FIG. 6 is a side elevational view of the diffuser unit illustrated in FIG. 5;

FIG. 7 is a partial sectional view taken generally along the line 7—7 in FIG. 5; and FIG. 8 is a sectional view taken generally along line 8—8 in FIG. 5.

DETAILED DESCRIPTION

Reference is now made particularly to FIG. 1, wherein the system of the present invention is generally designated as 10 and shown as being arranged within a lower level of a body of water 12 subject to a thermal stratification condition. The body of water may be an artificial impoundment, such as is created by a dam, or a natural impoundment, such as a lake.

More specifically, system 10 includes in its simplest form a supply air feed line or conduit 14; a plurality of branch ducts 16 spaced apart along an elongated, essentially horizontally disposed section of conduit 14; a plurality of air diffuser units 18, which are rotatably supported on branch ducts 16 in flow communication with feed line 14; and an air-water discharge valve device 20, which is disposed adjacent the downstream end of feed line 14. It will be understood that line 14 is suitably anchored by means, not shown, in order to position diffuser units 18 and valve device 20 in a spaced relationship above the floor of the reservoir or lake.

When system 10 is in use, air or other suitable oxygen containing fluid under pressure is introduced into line 14 from a suitable above ground source, such as compressor 22, for subsequent discharge by diffuser units 18 upwardly into body of water 12. As will be apparent, the pressure and flow rate at which air is supplied to the feed line will depend on various system parameters, including for instance the number and discharge flow rates of diffuser units 18. Also, it will be apparent that the number of diffuser units per feed line, and the length, diameter, number and orientation of the feed lines employed will depend upon the size and depth of the body of water to be treated. Further, it will be understood that the flow cross-sectioned area of the feed line and/or its branch ducts may be varied to insure uniform pressure air supply to its associated diffuser units.

Now referring particularly to FIGS. 5–8, it will be understood that each of diffuser units 18 is in the form of a jet reaction propeller consisting essentially of a contoured upper piece 24 and a flat bottom plate 26, which may be formed of any suitable corrosive resistant material. Upper piece 24 and plate 26 cooperate to define a centrally disposed hub portion forming a plenum chamber 28, which is arranged in flow communication with an associated branch duct 16, and a plurality of hollow wedge-shaped blades 30, which are arranged to extend radially of and in flow communication with chamber 28. The hollow interior of each of blades 30 is in turn placed in flow communicaion with the body of water in which the diffuser unit is immersed by means of orifices 32, which are formed in the base or rear wall 34 of blades 30, which is defined by upper piece 24.

As best shown in FIG. 7, bottom plate 26 is formed with an aperture dimensioned to freely receive an associated feed line branch duct 16, and is retained for rotation thereon by branch duct mounted, upper and lower bearing collars 38 and 40, respectively, which are suitably fixed to the branch duct by set screws or other suitable fasteners 42.

As by way of example, diffuser unit 18 may be mounted on its associated branch duct 16 by the successive operations of fixing lower bearing collar 40 to the branch duct; sliding bottom plate 26 downwardly over the branch duct into supporting engagement with lower bearing collar 40; fixing upper bearing collar 38 to the branch duct such as to free the bottom plate for limited vertical movement between the bearing collars; and finally joining upper piece 24 to the bottom plate. In a preferred construction illustrated in the drawings, upper piece 24 and plate 26 are joined together to complete the diffuser unit by means of generally U-shaped metal clips or clamps 44. However, other suitable means, such as adhesive or threaded fasteners, not shown, may be employed to complete assembly of the diffuser unit.

As will be apparent, when air under pressure is admitted to plenum chamber 28, such air is permitted to escape through orifices 32 as fine jets, which tend to create thousands of minute bubbles from which oxygen is absorbed by the water. This serves to decrease the density of the water and thereby promote a natural vertical circulation thereof. Moreover, the jets of escaping air produce a torque for effecting rotation of blades 30 in the direction indicated by arrow 45; the blades thereby positively producing vertical circulation of the water to a degree depending upon their number, configuration and pitch. On the theory that water absorbs oxygen proportionately to the area contacted, the orifices are preferably designed to produce small bubbles in order to maximize the surface area for any given volume of air flow.

An ideal arrangement is achieved when the forces acting on the diffuser unit 18 are nearly balanced such that bottom plate 26 is disposed intermediate and in non-contacting relationship with upper and lower bearing collars 38 and 40, and the annular space between the bottom plate and branch duct 16 is such as to permit air from plenum chamber 28 to bleed downwardly and create an effective air bearing. Balancing of the diffuser unit is obtained when the downward thrust on the unit resulting from upward circulation of the water induced by rotation of blades 30 is equal to the buoyancy of the plenum chamber and blades plus the upward thrust of the supply air on the top wall 46 of the hub portion, which defines the upper boundary of the plenum chamber. The optimum area of the top wall and duct 16 outlet opening may be calculated for any given operating air pressure and blade design. As will be apparent, when the diffuser unit is balanced under operating conditions, less friction and wear will occur at the bearing points and there will be an overall increase in efficiency.

While blades 30 have been shown as being hollow and straight, and formed with air jet defining discharge orifices 32, it is contemplated that various other types and shapes of hollow blades may be employed to give more effective hydraulic efficiency. Also, as by way of further illustration, the blades may be solid and employed to carry exteriorly mounted tubes, which are connected to the plenum chamber and define discharge orifices adjacent their radially outer end.

When the system is not in use, such as during the winter and spring months, the entire system may fill with water. In the usual dead end type feed line or pipe, excessive pressures are required to clear water from the feed line when it is desired to renew operation. Since ofttimes the available pressure is insufficient or the required pressure is in excess of system design, water may not be completely removed from adjacent the downstream end of the feed line with the result that one or more of the diffuser units or other discharge devices will remain blocked with water and be rendered inoperative. To overcome this problem, the present system incorporates the above mentioned air-water discharge valve device 20.

Now referring particularly to FIGS. 2–4, it will be seen that valve device 20 includes a valve plate or flap cover 50, which is secured to feed line 14 for free vertical pivotal movement between conduit end closed and open positions by a hinge device 52; a latch bar 54, which is secured to feed line 14 for vertical pivotal movement by a hinge device 56 and formed with an end cam lug 58 for retaining valve plate 50 in closed position; and an air float device 60, which is interconnected to latch bar 54 for conjunctive movement by a rod 62 freely extending through vertically aligned feed line apertures 64. More specifically, float 60 is in the form of a downwardly open sheet metal or plastic shell, which is connected to rod 62 by a transversely extending bracing plate 66 and formed adjacent its upper surface with one or more air bleed orifices 68. When the system is not in operation, float 60 is filled with water and supported in its phantom line position illustrated in FIG. 3 by a feed line mounted, support bracket 70.

When the system is in use, the elements of valve device 20 are disposed in their full line positions illustrated in FIG. 3; a sufficient quantity of the air escaping from the feed line through apertures 64 being collected within float 60 in order to substantially entirely displace water therefrom. In this respect, it will be understood that the rate at which air escapes from bleed apertures 68 is substantially less than the rate at which air is supplied to the float from the feed line. If the rate at which air escapes through aperture 64 is not sufficient, the feed line may be provided with additional apertures 72 and internally disposed air flow direction control baffles 74.

At the initiation of a period of non-use, air will gradually bleed from float 60 through bleed apertures 68 such that the float will gradually fill with water and sink to its phantom line position illustrated in FIG. 3. When this occurs, latch bar 54 moves into its unlatched position, wherein lug 58 is removed from latching engagement with valve plate 50. When feed line 14 has become filled with water entering through the diffuser units, as well as through apertures 64 and 72, the water pressure across valve plate 50 will be balanced, but the weight of the valve plate will continue to maintain same in closed position.

When the system is to be returned to use, pressure of the supplied air on the water within the feed line will force valve plate 50 to open in order to permit flow of water outwardly through the downstream end of the feed line. The air pressure will be maintained until the feed line is essentially free of water and float 60 has been raised to return latch bar 54 to its full line latched position shown in FIG. 3. At this point, the supply of air is momentarily interrupted in order to allow the valve plate to drop under the influence of gravity and be locked in closed position by lug 58; the lug being cammed downwardly by the valve plate to permit closing thereof and immediately returned to locked position by the float. Immediately thereafter the supply of air will be re-established to maintain air in the feed line under normal design or operating pressure. It will be understood that the amount of air escaping from float 60 through bleed apertures 68 is insufficient to permit lowering of the float and latch bar 54 into unlatching position during the extremely short period of time that the air flow is interrupted to permit the gravity lowering of valve plate 50. Thus, float 60 may be characterized as being responsive to the condition of the gas supply or source, that is, the float serves to place latch bar 54 in its latching and unlatching positions when the gas supply is operable and inoperable, respectively.

As will be apparent from the foregoing, I have devised an improved system for effecting destratification and oxygenation of bodies of water. Moreover, it will be understood that while the disclosed diffuser unit and valve device constructions are preferably used in combination, they possess individual novelty and may therefore be separately employed in modification of existing systems.

I claim:

1. A system for effecting thermal destratification of a body of water by the introduction of oxygen containing gas into a lower level thereof, which comprises in combination:

an oxygen containing gas supply conduit including an elongated section essentially horizontally disposed within said lower level;

gas supply means selectively operable for supplying gas under operating pressure to one end of said conduit section;

a plurality of gas discharge means spaced apart lengthwise of said conduit section for discharging gas therefrom into said lower level when said gas supply means is in operation, said discharge means permitting flow of water into said conduit section for collection therein when said gas supply means is not in operation; and a valve device arranged adjacent an other end of said conduit opposite to said one end, said valve device including movable means, latch means and means responsive to said gas supply means, said movable means tending to move from an other end closed position into an other end open position when said gas supply means is in operation and to move from said other end open position into said other end closed position when said gas supply means is not in operation, said latch means being movable between unlatching and latching positions, said latch means when in unlatching position permitting movement of said member between said positions thereof, said latch means when in latching position permitting movement of said member from said other end open position into said other end closed position while latching said member from movement from said other end closed position into said other end open position, and said responsive means placing said latch means in said unlatching and latching positions when said gas supply means is not in operation and in operation, respectively.

2. A system for effecting thermal destratification of a body of water by the introduction of oxygen containing gas into a lower level thereof, which comprises in combination:

an oxygen containing gas supply conduit including an elongated section essentially horizontally disposed within said lower level;

gas supply means selectively operable for supplying gas under operating pressure to one end of said conduit section;

a plurality of gas discharge means spaced apart lengthwise of said conduit section for discharging gas therefrom into said lower level when said gas supply means is in operation, said discharge means permitting flow of water into said conduit section for collection therein when said gas supply means is not in operation; and a valve device arranged adjacent an other end of said conduit opposite to said one end for normally closing said other end when said gas supply means is in operation, while permitting discharge through said other end of water collected in said conduit section when said gas supply means is returned to operation, said valve device comprising a valve plate hingedly mounted on said other end of said conduit section for vertical pivotal movement between other end open and closed positions; gas supportable float means, said float means having an aperture for bleeding gas therefrom at a given rate; a latch device for releasably latching said valve plate in said closed position; connecting means for coupling said float means and latch means for conjunctive movement; and float gas supply means for supplying gas to said float means from said conduit section at a rate in excess of said given rate when said gas supply means is in operation whereby to expel water from said float means and lift said float means into a first position, said aperture permitting said float means to slowly fill with water and sink into a second position when said float means is not supplied with gas by said float gas supply means, said latch device being disposed in valve plate latched and unlatched positions when said float means is in said first and second positions, respectively, said valve plate being adapted to momentarily move said latch device from latched to unlatched position during movement of said valve plate from open to closed position thereof, and said valve device being characterized in that upon return of said gas supply means to operation after a period of non-operation during which water collects in said conduit section and said float means fills with water to move same into its second position said valve plate is initially forced into open position by collected water discharged from said other end of said conduit section by gas within said conduit section whereafter said float means is lifted into said first position by gas supplied by said float gas supply means, that upon momentary interruption of operation of said gas supply means after said collected water is discharged and said float menas is lifted as aforesaid said valve plate is forced by gravity to move from said open into said closed position and effect momentary movement of said latch device as aforesaid, and that upon immediate return of said gas supply means to operation said float means is maintained in said first position thereof whereby to maintain said latch means in said latched position to thereby maintain said valve plate in said closed position.

3. A system according to claim 2, wherein said latch device is supported beneath said other end of said conduit section for vertical pivotal movement between latched and unlatched positions, said float means is downwardly open and disposed above said other end of said conduit section, said float gas supply means includes at least vertically aligned openings formed adjacent said other end of said conduit section below said float means, said connecting means includes rod means freely extending through said aligned openings and connected adjacent upper and lower ends thereof to said float means and said latch device.

4. A system according to claim 2, wherein said conduit section includes vertically upstanding branch ducts spaced apart lengthwise of said conduit section; and each said discharge means comprises a gas jet reaction propeller supported for rotation on one of said branch ducts in gas flow communication with said conduit section, each said propeller includes upper and lower parts and means for joining said parts, said parts being configured to define a centrally disposed hub portion bounding a plenum chamber arranged in flow communication with an associated branch duct and a plurality of blades for effecting upward circulation of water when said propeller is rotated, said blades extending radially from said hub portion and having reaction gas jet defining orifices arranged at least adjacent their radially outer ends for effecting rotation of said propeller, said orifices being in flow communication with said chamber, and said lower part being journaled on said associated branch duct.

5. A system according to claim 4, wherein said blades are hollow for placing said orifices in flow communication with said chamber as aforesaid.

6. A system according to claim 5, wherein said upper part is contoured, said lower part is a flat plate having an opening therethrough for freely receiving said associated branch duct, and said associated branch duct carries vertically spaced collar bearings for retaining said lower part for limited vertical movement therebetween.

7. A system for effecting thermal destratification of a body of water by the introduction of oxygen containing gas into a lower level thereof, which comprises in combination:

an oxygen containing gas supply condiut including an elongated section essentially horizontally disposed within said lower level, said conduit section includes vertically upstanding branch ducts spaced apart lengthwise of said conduit section;

gas supply means selectively operable for supplying gas under operating pressure to one end of said conduit section;

a plurality of gas discharge means spaced apart lengthwise of said conduit section for discharging gas therefrom into said lower level when said gas supply means is in operation, said discharge means permitting flow of water into said conduit section for collection therein when said gas supply means is not in operation, each said discharge means comprises a gas jet reaction propeller supported for rotation on one of said branch ducts in gas flow communication with said conduit section, each said propeller includes a centrally disposed hub portion bounding a plenum chamber arranged in flow communication with an associated branch duct and a plurality of blades for effecting upward circulation of water when said propeller is rotated, said blades extending radially from said hub portion and having reaction gas jet defining orifices arranged at least adjacent their radially outer ends for effecting rotation of said propeller, said orifices being in flow communication with said chamber, an upper end of said associated branch duct freely extends upwardly through an opening in a lower boundary wall of said chamber and cooperates with said opening to define an annular space through which gas may pass from said chamber to provide a gas bearing between said upper end and said lower boundary wall, said associated branch duct carrying spaced upper and lower bearing means for retaining said lower boundary wall for limited vertical movement therebetween, and said chamber having an upper boundary wall whereby gas passing into said chamber from said associated branch duct produces an upwardly directed force on said propeller, said force cooperating with the bouyancy of the propeller to essentially balance a downwardly directed reaction force produced on said propeller by upward circulation of said water upon rotation of said blades; and a valve device arranged adjacent an other end of said conduit opposite to said one end for normally closing said other end when said gas supply means is in operation, while permitting discharge through said other end of water collected in said conduit section when said gas supply means is returned to operation.

8. In a system for promoting vertical circulation of a body of water including source means for supplying an oxygen containing gas under pressure, conduit means arranged in flow communication with said source and submerged gas discharge means for discharging gas from the conduit means into the water, the improvement comprising:

said conduit means includes a vertically upstanding duct; and said discharge means comprises a gas jet reaction propeller supported for rotation adjacent an upper end of said duct in gas flow communication with said conduit means, said propeller including a centrally disposed hub portion bounding a plenum chamber arranged in flow communication with said duct and a plurality of blades for effecting upward circulation of water when said propeller is rotated, said blades extending radially from said hub portion and having reaction gas jet defining orifices for effecting rotation of said propeller, said orifices being in flow communication with said chamber, an upper end of said duct freely extending upwardly through an opening in a lower boundary wall of said chamber and cooperating with said opening to define an annular space through which gas may pass from said chamber to provide a gas bearing between said upper end and said lower boundary wall, said duct carrying spaced upper and lower bearing means for retaining said lower boundary wall for limited vertical movement therebetween, and said chamber having an upper boundary wall whereby gas passing into said chamber from said duct produces an upwardly directed force on said propeller, said force cooperating with the bouyancy of the propeller to essentially balance a downwardly directed reaction force produced on said propeller by upward circulation of said water upon rotation of said blades.

9. In a system for promoting vertical circulation of a body of water including source means for supplying an oxygen containing gas under pressure, conduit means arranged in flow communication with said source and submerged gas discharge means for discharging gas from the conduit means into the water, the improvement comprising:

said conduit means includes a vertically upstanding duct; and said discharge means comprises a gas jet reaction propeller supported for rotation adjacent an upper end of said duct in gas flow communication with said conduit means, said propeller including a centrally disposed hub portion bounding a plenum chamber arranged in flow communication with said duct and a plurality of blades for effecting upward circulation of water when said propeller is rotated, said blades extending radially from said hub portion and having reaction gas jet defining orifices for effecting rotation of said propeller, said orifices being in flow communication with said chamber, said blades are hollow for placing said orifices in flow communication with said chamber as aforesaid, each said propeller includes upper and lower parts cooperating to define said hub portion and said blades and means for joining said parts, said upper part is contoured, said lower part is a flat plate having an opening therethrough for freely receiving an upper end of said duct whereby to journal said propeller on said duct and provide for gas flow communication between said chamber and said duct, said flat plate opening and said duct cooperating to define an annular space through which gas may pass from said chamber to provide a gas bearing between said flat plate and said duct, and said duct carries vertically spaced collar bearings for retaining said lower part for limited vertical movement therebetween.

10. A system for effecting thermal destratification of a body of water by the introduction of oxygen containing gas into a lower level thereof, which comprises in combination:

an oxygen containing gas supply conduit including an elongated section essentially horizontally disposed within said lower level;

gas supply means selectively operable for supplying gas under operating pressure to one end of said conduit section;

a plurality of gas discharge means spaced apart lengthwise of said conduit section for discharging gas therefrom into said lower level when said gas supply means is in operation, said discharge means permitting flow of water into said conduit section for collection therein when said gas supply means is not in operation; and a valve device arranged adjacent an other end of said conduit opposite to said one end and being responsive to operation of said gas supply means for permitting discharge through said other end of water collected in said conduit section when said gas supply means is returned to operation, for closing said other end upon momentary interruption of operation of said gas supply means after said collected water is discharged and for maintaining said other end closed during operation of said gas supply means after said momentary interruption.

* * * * *